(12) United States Patent
Yang et al.

(10) Patent No.: US 10,599,273 B2
(45) Date of Patent: Mar. 24, 2020

(54) DISPLAY PANEL INCLUDING ELECTRODE BLOCKS CONNECTED BY BRIDGE STRUCTURE AND DISPLAY DEVICE

(71) Applicant: SHANGHAI TIANMA AM-OLED CO., LTD., Shanghai (CN)

(72) Inventors: Jiayao Yang, Shanghai (CN); Yilin Xu, Shanghai (CN); Juan Zhu, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 74 days.

(21) Appl. No.: 15/984,432

(22) Filed: May 21, 2018

(65) Prior Publication Data

US 2018/0267648 A1    Sep. 20, 2018

(30) Foreign Application Priority Data

Dec. 27, 2017 (CN) .......................... 2017 1 1443165

(51) Int. Cl.
    *G06F 3/044* (2006.01)
(52) U.S. Cl.
    CPC .... *G06F 3/044* (2013.01); *G06F 2203/04111* (2013.01)
(58) Field of Classification Search
    CPC .................. G06F 3/044; G06F 2203/04111
    See application file for complete search history.

(56) References Cited

U.S. PATENT DOCUMENTS

2014/0327840 A1* 11/2014 Kim .................. G06F 3/044
                                                    349/12
2015/0362949 A1* 12/2015 Chen ............... G02F 1/13338
                                                   345/173

FOREIGN PATENT DOCUMENTS

CN            202275389 U     6/2012

\* cited by examiner

*Primary Examiner* — Yaron Cohen
(74) *Attorney, Agent, or Firm* — Kilpatrick Townsend & Stockton, LLP

(57) ABSTRACT

A display panel and a display device include first electrodes arranged in first direction and extending in second direction, and second electrodes arranged in second direction and extending in first direction; any two adjacent first electrode blocks in each first electrode are electrically connected to each other by a first connection electrode; any two adjacent second electrode blocks in each second electrode are connected to each other by a bridge structure, each bridge structure includes at least two bridges; each first connection electrode includes a first overlapping electrode and a first non-overlapping electrode, orthographic projections of the first overlapping electrode and the bridges on the display panel overlap, and orthographic projections of the first non-overlapping electrode and the bridges on the display panel do not overlap; and the first overlapping electrode has a length in the first direction smaller than the first non-overlapping electrode in the first direction.

20 Claims, 8 Drawing Sheets

DISPLAY PANEL INCLUDING ELECTRODE BLOCKS CONNECTED BY BRIDGE STRUCTURE AND DISPLAY DEVICE

CROSS-REFERENCE TO RELATED APPLICATIONS

The present application claims priority to Chinese Patent Application No. 201711443165.6, filed on Dec. 27, 2017, the content of which is incorporated herein by reference in its entirety.

TECHNICAL FIELD

The present disclosure relates to the technical field of display and, more particularly, to a display panel and a display device.

BACKGROUND

In recent years, touch technologies have been applied more and more widely as the human-computer interaction technology develops. Touch screens are sensitive display devices that can receive input signals from a finger or other contacts, and are classified into induction touch screens, capacitance touch screen panels, and resistance touch panels. The capacitance touch panels (CTP) mainly uses the conductivity of a human body to control the screen, and determines a touch position according to a capacitance change of a touched area.

However, in the related art, the bridge used in a display panel for connecting adjacent electrodes is generally made of a metal material which is commonly light-proof. Thus, in order to reduce the visibility of the bridge, the bridge is generally manufactured as short and thin as possible, which not only causes a higher breakage possibility of the bridge, but also affects the reliability of a touch electrode.

SUMMARY

The present disclosure provides a display panel and a display device which can improve the reliability and the touch sensitivity of a touch electrode.

In a first aspect, the present disclosure provides a display panel. The display panel includes a plurality of first electrodes which is arranged in a first direction and extends in a second direction, and a plurality of second electrodes which is arranged in the second direction and extends in the first direction. Each of the plurality of first electrodes includes a plurality of first electrode blocks and a plurality of first connection electrodes, the plurality of first electrode blocks and the plurality of first connection electrodes being arranged alternately in the second direction; and any two adjacent first electrode blocks in the each first electrode are electrically connected to each other by at least one of the plurality of first connection electrodes. Each of the plurality of second electrodes includes a plurality of second electrode blocks and a plurality of bridge structures, the plurality of second electrode blocks and the plurality of bridge structures being arranged alternately in the first direction; and any two adjacent second electrode blocks in the each second electrode are connected to each other by at least one of the plurality of bridge structures, and each of the plurality of bridge structures includes at least two bridges each connected to the two adjacent second electrode blocks connected to the bridge structure. Each of the plurality of first connection electrodes includes a first overlapping electrode and a first non-overlapping electrode. An orthographic projection of the first overlapping electrode on the display panel overlaps an orthographic projection of at least one bridge of the plurality of bridge structures on the display panel, and an orthographic projection of the first non-overlapping electrode on the display panel does not overlap an orthographic projection of any bridge of the plurality of bridge structures on the display panel. The first overlapping electrode has a length in the first direction smaller than a length of the first non-overlapping electrode in the first direction.

In a second aspect, the present disclosure provides a display device including the display panel.

BRIEF DESCRIPTION OF DRAWINGS

In order to illustrate the technical solutions of the embodiments of the present disclosure or in the related art more clearly, a brief introduction is given below to the drawings used in the description of the embodiments or the related art. The drawings in the description below are used for illustrating some embodiments of the present disclosure.

DESCRIPTION OF EMBODIMENTS

The terms used in the embodiments of the present disclosure are for the purpose of illustrating the embodiments only, rather than limiting the present disclosure. The terms "a", "the" and "this" of singular forms used in the embodiments of the present disclosure and the attached claims are also intended to include their plural forms.

Figure 1:
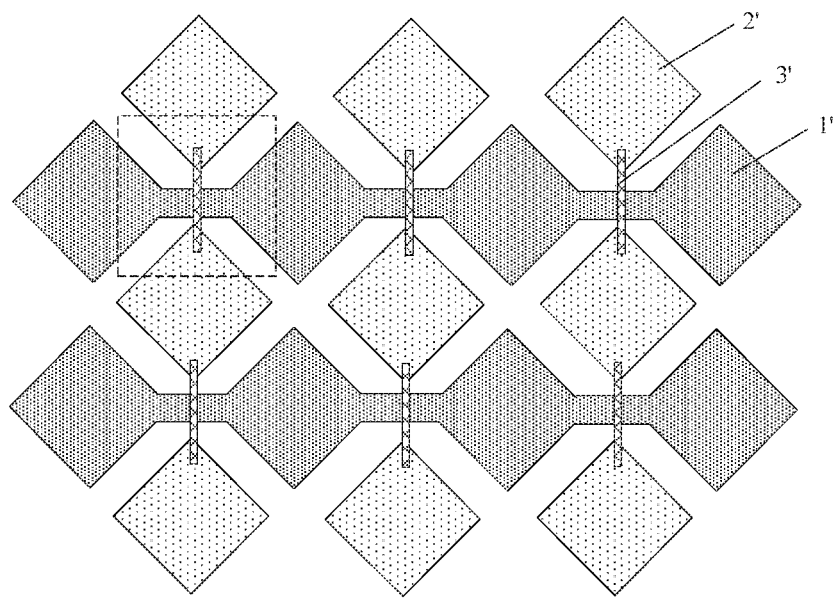
FIG. 1 is a schematic view of a touch electrode in a partial region of a display panel in the related art.

Referring to FIG. 1, FIG. 1 is a schematic diagram of an electrode arrangement using a mutual-capacitance touch technology in the related art. A display panel comprises a plurality of first electrodes 1' and a plurality of second electrodes 2', and at a crossed position of the first electrodes 1' and the second electrodes 2', every two adjacent electrodes 2' are electrically connected to each other by a bridge 3'. However, in the related art, the bridge is generally made of a metal material which is commonly light-proof. Thus, in order to reduce the visibility of the bridge, the bridge is generally manufactured as short and thin as possible, which not only causes a higher breakage possibility of the bridge, but also affects the reliability of a touch electrode. In addition, the resistance of the first electrode 1' is large as a portion of the first electrode 1' corresponding to the bridge 3' is narrow, affecting the touch sensitivity.

Figure 3:
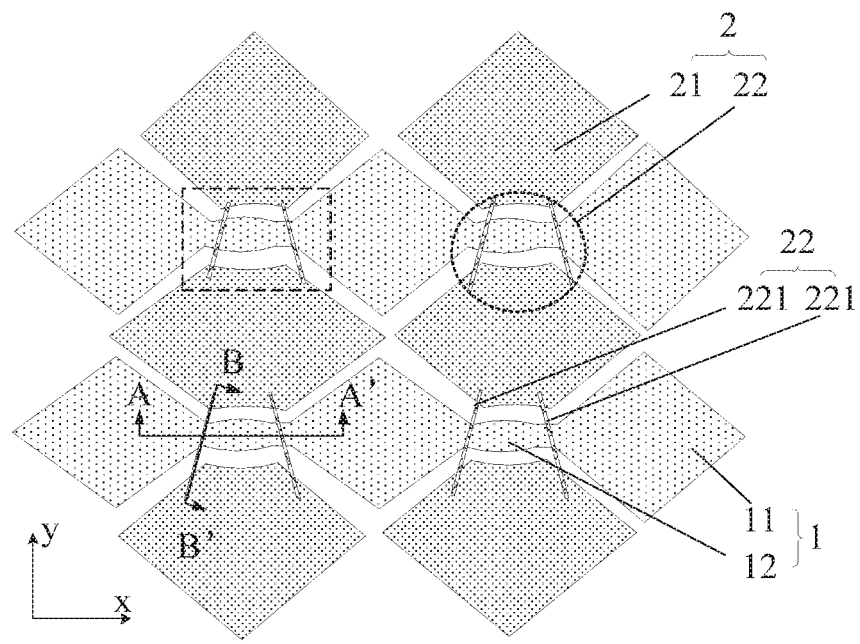
FIG. 3 is a first schematic view of a touch electrode of a display panel according to an embodiment of the present disclosure.

Referring to FIG. 3. FIG. 3 is a schematic view of a touch electrode in a partial region of a display panel according to an embodiment of the present disclosure. The display panel includes: a plurality of first electrodes 1 which are arranged in a first direction y and extends in a second direction x, and a plurality of second electrodes 2 which are arranged in the second direction x and extends in the first direction y.

Each first electrode 1 includes a plurality of first electrode blocks 11 and a plurality of first connection electrodes 12, the plurality of first electrode blocks 11 and the plurality of first connection electrodes 12 being arranged alternately in the second direction x. Each second electrode 2 includes a plurality of second electrode blocks 21 and a plurality of bridge structures 22, the plurality of second electrode blocks 21 and the plurality of bridge structures 22 being arranged alternately in the first direction y.

Figure 4:
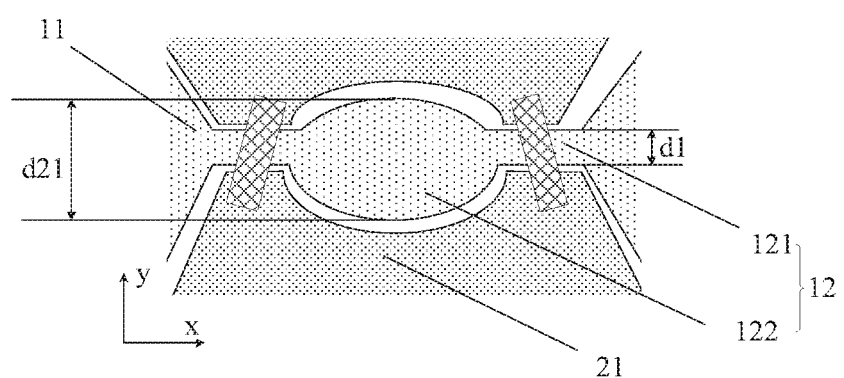
FIG. 4 is an enlarged schematic view of a rectangular dash line box portion in FIG. 3.

In each first electrode 1, any two adjacent first electrode blocks 11 are electrically connected through the corresponding first connection electrode 12. In each second electrode 2, any two adjacent second electrode blocks 21 are connected to each other by the bridge structure 22, each bridge structure 22 including at least two bridges 221 each connected to the two adjacent second electrode blocks 21 connected to the bridge structure. FIG. 4 is an enlarged schematic view of a rectangular dash line box portion in FIG. 3. Referring to FIG. 4, the first connection electrode 12 includes a first overlapping electrode 121 and a first non-overlapping electrode 122. An orthographic projection of the first overlapping electrode 121 on the display panel overlaps an orthographic projection of at least one bridge 221 on the display panel; and an orthographic projection of the first non-overlapping electrode 122 on the display panel does not overlap an orthographic projection of any bridge 221 on the display panel. In addition, the length d1 of the first overlapping electrode 121 in the first direction y is smaller than the length of the first non-overlapping electrode 122 in the first direction y.

In the display panel provided by the present embodiment, the bridge structure 22 connecting the two adjacent second electrode blocks 21 includes at least two bridges 221. In addition, the length of the first overlapping electrode 121 in the first direction y is smaller than a length of the first non-overlapping electrode 122 in the first direction y. Based on this structure, when one bridge 221 breaks, the remaining bridge(s) 211 still can connect the two adjacent second electrode blocks 21, so that a failure risk of the second electrode 2 due to the breakage of the bridge 221 is reduced, thereby increasing the reliability of a touch electrode. Moreover, in the present embodiment, at least one portion of the first non-overlapping electrode 122 has a length in the first direction y is set to be larger than the length d1 of the first overlapping electrode 121. For example, as shown in FIG. 4, in this embodiment, a length d21 of a middle portion of the first non-overlapping electrode 122 in the first direction y is set to be larger than the length d1 of the first overlapping electrode 121. That is, in the first direction y, the first non-overlapping electrode 122 is widened relative to the first overlapping electrode 121, which means the amount of electric charge flowing through the first non-overlapping electrode 122 is larger when the display panel works, namely, a resistance of the first non-overlapping electrode 122 becoming smaller. Thus, a resistance of the first connection electrode 12 is smaller, so that a large resistance problem caused by the thin first overlapping electrode 121 at the position in the first electrode 1 corresponding to the bridge 211 is solved, thereby improving the touch sensitivity of the display panel. In addition, as the first non-overlapping electrode 122 is widened, the large resistance problem caused by the thin first overlapping electrode 121 is solved. Further, in the present embodiment, the first overlapping electrode 121 may be set as short as possible in the first direction y, and accordingly, the bridge 221 is set as short as possible in the first direction y, so as to reduce the visibility of the bridge 221 and improve a display effect. Besides, an overlapping area of the first electrode 1 and the second electrode 2 may also be reduced when the bridge 221 is set as short as possible in the first direction y, so that in an touch operation, interference between a touch driving signal and a touch sensing signal is reduced, improving the touch sensitivity.

Figure 2:
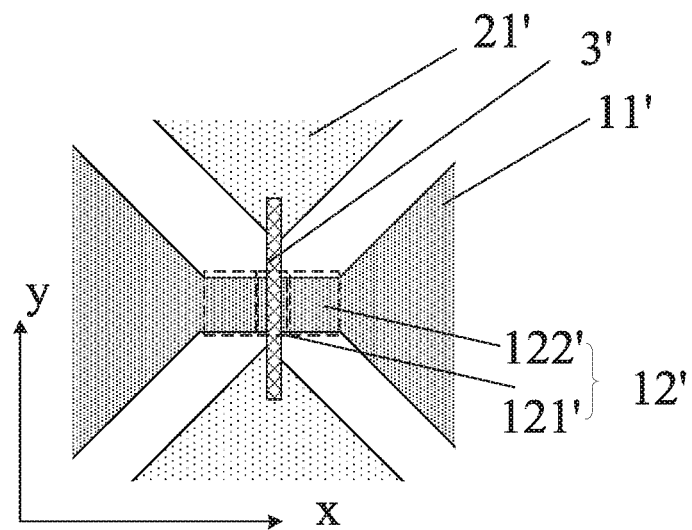
FIG. 2 is an enlarged schematic view of a dash line box portion in FIG. 1.
Figure 5:
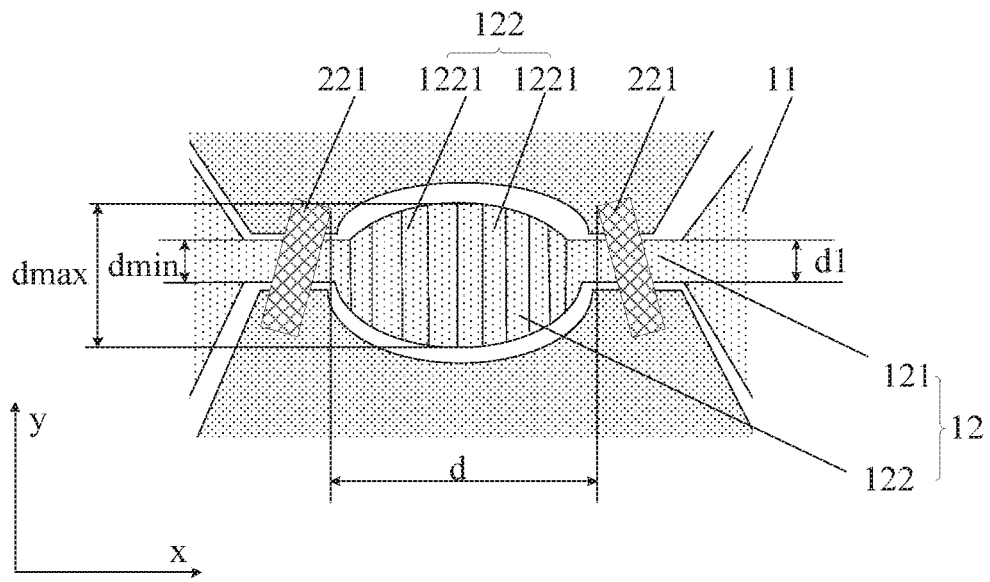
FIG. 5 is a second schematic view of a touch electrode of a display panel according to another embodiment of the present disclosure.

Particularly, referring to FIG. 5, FIG. 5 is a second schematic view of the touch electrode of the display panel according to an embodiment of the present disclosure. A length of the first overlapping electrode 121 in the first direction y is d1. The first non-overlapping electrode 122 includes a plurality of first non-overlapping sub-electrodes 1221 arranged along the second direction x; and in addition, the lengths of the first non-overlapping sub-electrodes 1221 in the first direction y increase first and then decrease. In the first non-overlapping sub-electrodes 1221, a length dmax of the longest non-overlapping sub-electrode 1221 in the first direction y is greater than or equal to 1.5d1; and a length dmin of the shortest non-overlapping sub-electrode 1221 in the first direction y is equal to d1. This arrangement in the present embodiment ensures that the lengths of other portions of the first non-overlapping electrode 122 except its two ends are larger than the length of the first overlapping electrode 121, so that the amount of electric charge flowing through the first non-overlapping electrode 122 is increased. That is, the resistance of the first non-overlapping electrode 122 is reduced, and thus, the resistance of the first connection electrode 12 is reduced. In addition, the lengths of the plurality of first non-overlapping sub-electrodes 1221 in the first direction y increase first and then decrease. That is, the outline of the first non-overlapping electrode 122 protrudes outwards. Referring to FIG. 2, FIG. 2 is an enlarged schematic view of a dash line box portion in FIG. 1. A first electrode 1' includes a first electrode block 11' and a first connection electrode 12'. A portion of the first connection electrode 12' corresponding to a bridge 3' is a first overlapping electrode 121'. A portion of the first connection electrode 12' that does not correspond to the bridge 3' is a first non-overlapping electrode 122'. The lengths of the first non-overlapping electrode 122' and the first overlapping electrode 121' in the first direction y are set to be identical. It can be seen that an outline of the first non-overlapping electrode 122' is substantially linear. A portion of the first connection electrode 12' that forms a parallel electric field with the second electrode 2' is only a portion of the first overlapping electrode 121' shown in the drawing. Comparatively, as shown in FIG. 5, in the present embodiment, the outline length of the first non-overlapping electrode 122 is increased, so that a larger portion in the first electrode and the second electrode form a parallel electric field. That is, a changeable range of the parallel electric field between the two electrodes is widened. Therefore, the touch detection accuracy is increased during touch detection, and thus the display panel provided in this embodiment has a better touch effect. In one embodiment, further referring to FIG. 5, in the first non-overlapping electrode 122, the first non-overlapping sub-electrode 1221 close to a middle position of the first non-overlapping electrode 122 is longer, while the first non-overlapping sub-electrode 1221 away from the middle position of the first non-overlapping electrode 122 is shorter.

Particularly, in an embodiment, an edge of the first non-overlapping electrode 122 may be set to be arched or to be polygonal with a large internal obtuse angle so as to avoid a point discharge phenomenon caused by a sharp corner at the edge of the electrode.

In one embodiment, the length of the first non-overlapping electrode 122 in the first direction y is at least 100 μm. That is, the length of the first non-overlapping electrode 122 at the narrowest position is at least 100 μm, so as to avoid a condition that the resistance is increased excessively due to a too narrow first non-overlapping electrode 122.

Further referring to FIG. 5, a distance d between any two adjacent bridges 221 in the second direction x is greater than 0 and less than 150 μm. In this way, according to the arrangement with a wide first electrode block 11 and a narrow first connection electrode 12, the narrow first connection electrode 12 is prevented from being too long in the second direction x, and thus, the problem that the resistance of the first connection electrode 12 is increased excessively is avoided.

Figure 6:
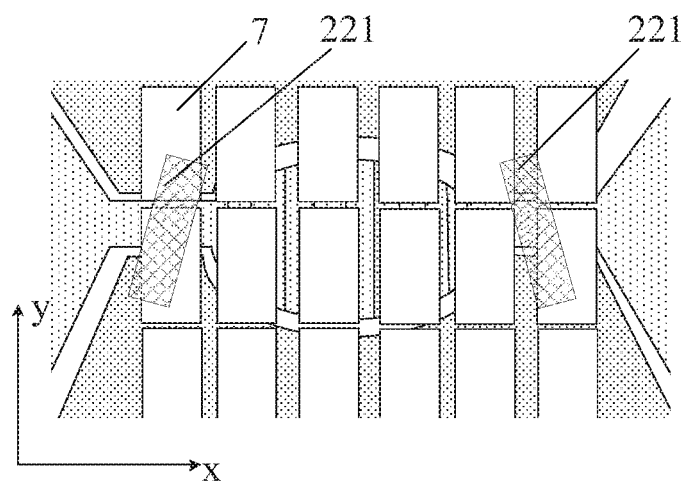
FIG. 6 is a third schematic view of a touch electrode of a display panel according to yet another embodiment of the present disclosure.
Figure 7:
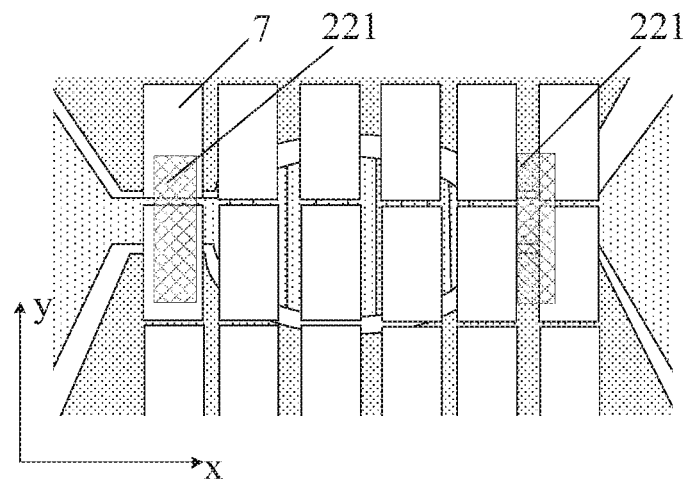
FIG. 7 is a schematic view showing a situation in which an extending direction of an bridge in FIG. 6 is the same as the first direction y.

It can be understood that in actual process production, in order to avoid shielding pixels and influencing normal light emission of the pixels, the bridge is generally arranged at a position between adjacent pixels. However, for some specific pixel arrangement manners, sometimes, the arrangement of the bridge may not bypass a certain pixel. In this case, referring to FIG. 6, FIG. 6 is a third schematic view of a touch electrode of a display panel according to yet another embodiment of the present disclosure. The display panel provided in this embodiment further includes a plurality of sub-pixels 7 arranged in an array in the first direction y and the second direction x. The extending direction of the bridge 221 is different from the first direction y. As the bridge 221 is generally made of a metal material which is commonly light-proof, compared with the arrangement manner that the bridge 221 extends in the first direction y, the bridge 221 only shields a smaller area of sub-pixels when not extending in the first direction y. As shown in FIG. 6, the extending direction of each bridge 221 is different from the arrangement direction of the sub-pixels 7, so that a part of the bridge 221 shields the corresponding sub-pixels; and the other part of the bridge 221 shields a region between two adjacent sub-pixels, which does not affect the light emission of the sub-pixels. If the bridge 221 extends in the first direction y, i.e., the extending direction of the bridge and the arrangement direction of the sub-pixels being the same, as shown in FIG. 7 which is a schematic view of the bridge extending in the first direction y, the whole bridge 221 will shield the corresponding sub-pixels, and thus, compared with the arrangement manner shown in FIG. 6, light emitted by a larger area of sub-pixels is shielded, affecting the display effect.

Exemplarily, the directions of the multiple bridges 221 in each bridge structure 22 described above may be the same or different, which is not limited in the present disclosure.

Figure 8:
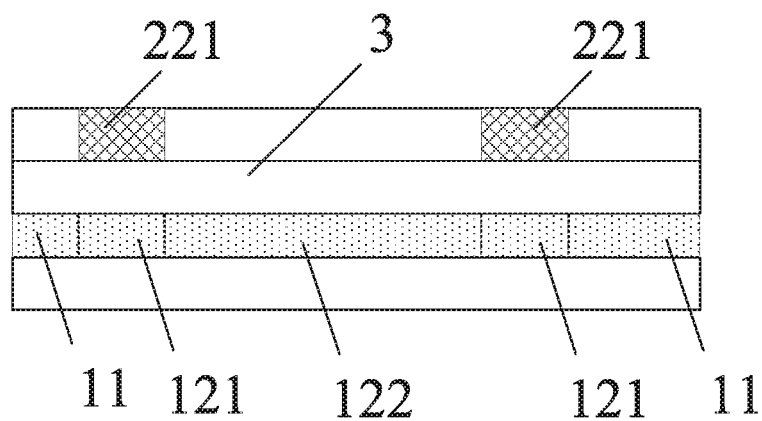
FIG. 8 is a schematic view of a cross-sectional structure in the AA' direction in FIG. 3.
Figure 9:
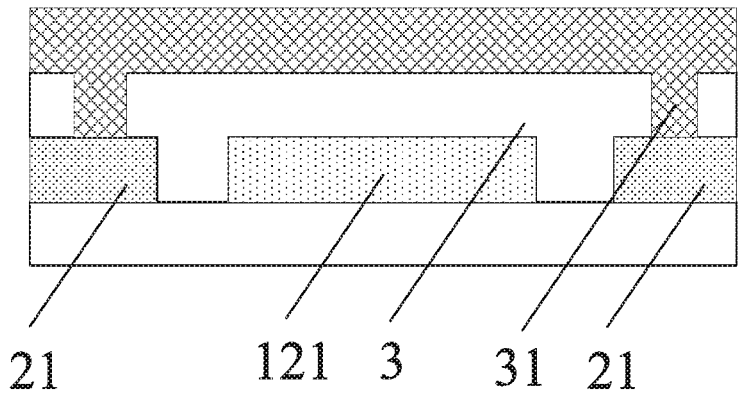
FIG. 9 is a schematic view of a cross-sectional structure in the BB' direction in FIG. 3.

Further, referring to FIGS. 8 and 9, FIG. 8 is a schematic view of a cross-sectional structure in the AA' direction in FIG. 3; and FIG. 9 is a schematic view of a cross-sectional structure in the BB' direction in FIG. 3. The first electrode block 11, the first overlapping electrode 121, the first non-overlapping electrode 122 and the second electrode block 21 are arranged in the same layer.

An insulating layer 3 is arranged between the first overlapping electrode 121 and a bridge 221 whose orthographic projection on the display panel overlaps an orthographic projection of the first overlapping electrode 121 on the display panel. The bridge 221 is connected to two adjacent second electrode blocks 21 through a via hole in the insulating layer 3.

Figure 10:
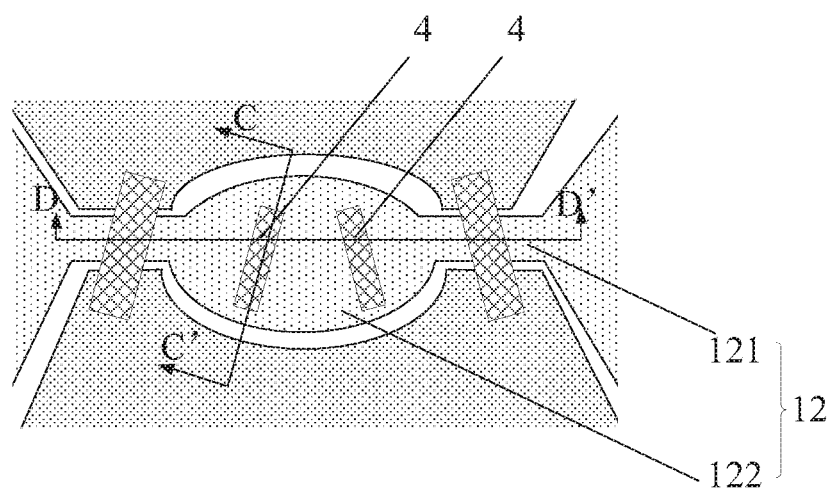
FIG. 10 is a fourth schematic view of a touch electrode of a display panel according to still another embodiment of the present disclosure.
Figure 11:
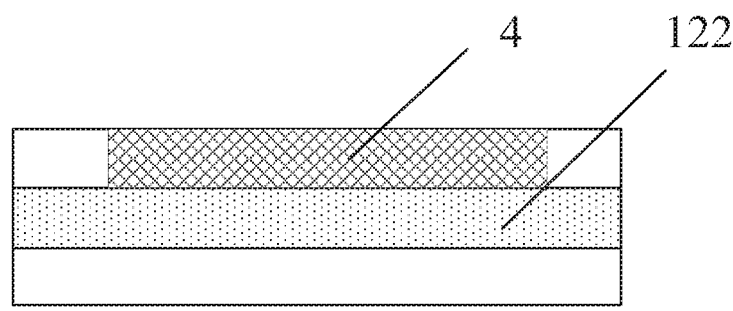
FIG. 11 is a schematic view of a section structure in the CC' direction in FIG. 10.

Referring to FIGS. 10 and 11, FIG. 10 is a fourth schematic view of a touch electrode of a display panel according to yet another embodiment of the present disclosure; and FIG. 11 is a schematic view of a cross-sectional structure in the CC' direction in FIG. 10. The display panel provided in the present embodiment further includes a metal strip 4 in contact with a layer where the first overlapping electrode 121 is located. An orthographic projection of the metal strip 4 on the display panel is located within an orthographic projection of the first non-overlapping electrode 122 on the display panel. In the embodiment of the present disclosure, by arranging the metal strip 4 on the first connection electrode 12, a cross-sectional area of the first connection electrode 12 is increased, and thus the amount of electric charge flowing through the first connection electrode 12 is increased. That is, the resistance of the first connection electrode 12 is reduced, so that a problem of increased resistance caused by a short bridge 221 is solved, thereby improving the touch sensitivity of the display panel. In addition, in this embodiment, as the first connection electrode 12 is provided with the metal strip 4, the increased resistance problem caused by the thin first overlapping electrode 121 is solved. Further, in the present embodiment, the first overlapping electrode 121 in the first direction y may be set as short as possible, and accordingly, the bridge 221 is set as short as possible in the first direction y, so as to reduce the visibility of the bridge 221 and improve a display effect. Besides, an overlapping area of the first electrode 1 and the second electrode 2 may also be reduced when the bridge 221 is set as short as possible in the first direction y, so that in an touch operation, interference between a touch driving signal and a touch sensing signal is reduced, improving the touch sensitivity.

In one embodiment, the number of the metal strip located in a orthographic projection of the first non-overlapping electrode of each first connection electrode on the display panel may be from 1 to 3, so as to avoid a problem that too much light emitted by the sub-pixels is shielded by the excessive metal strips 4. Exemplarily, a material of the metal strip 4 may be any one selected from a group consisting of molybdenum, silver, and aluminum. A material of the plurality of first electrodes and a material of the plurality of second electrodes include any one of indium tin oxide, indium zinc oxide, or indium gallium zinc oxide; and a material of the bridges comprises any one of molybdenum, silver or aluminum.

Figure 12:
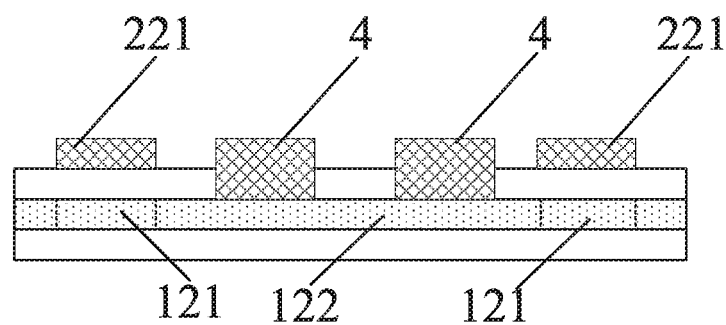
FIG. 12 is a schematic view of a section structure in the DD' direction in FIG. 10.

In one embodiment, referring to FIG. 12, FIG. 12 is a schematic view of a cross-sectional structure in the DD' direction in FIG. 10. The metal strip 4 and the bridge 221 are made of the same material, and are located in the same layer. In this embodiment, by adopting the above arrangement manner, the metal strip 4 and the bridge 221 may be formed by only one patterning process, so that both the process steps and the process complexity are reduced.

Figure 13:
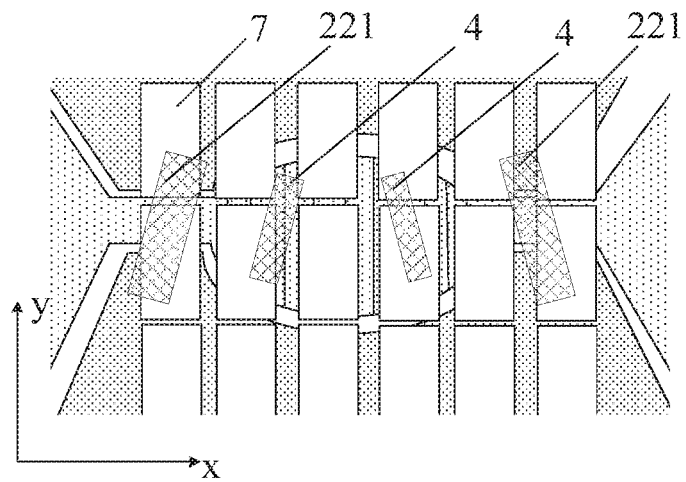
FIG. 13 is a fifth schematic view of a touch electrode of a display panel according to yet another embodiment of the present disclosure.
Figure 14:
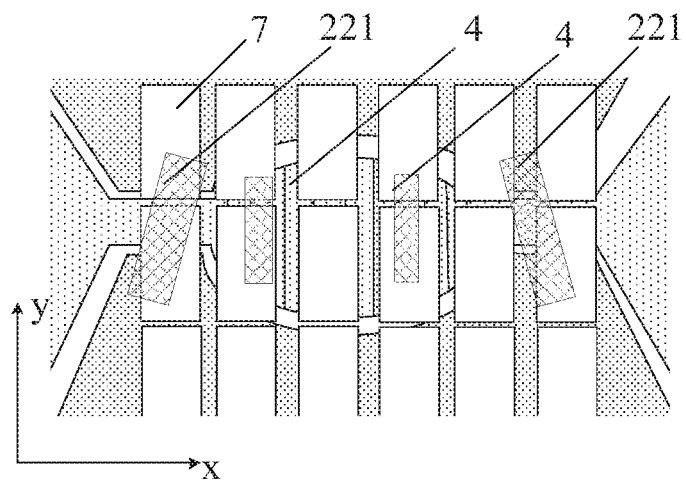
FIG. 14 is a schematic view showing a situation in which an extending direction of a metal strip in FIG. 13 is the same as the first direction y.

It should be noted that as shown in FIG. 13, the display panel provided in an embodiment of the present disclosure further includes a plurality of sub-pixels 7 arranged in an array in the first direction y and the second direction x. The extending direction of the metal strip 4 is different from the first direction y and the second direction x. As the metal strip 4 is generally made of a material which is commonly light-proof, compared with the arrangement manner that the metal strip 4 extends in the first direction y or the second direction x, the metal strip 4 only shields a smaller area of sub-pixels 7 when not extending in the first direction y or the second direction x. As shown in FIG. 13, the extending direction of each metal strip 4 is different from the arrangement direction of the sub-pixels 7, so that a part of the metal strip 4 shields the corresponding sub-pixels; and the other part of the metal strip 4 shields a region between two adjacent sub-pixels, which does not affect the light emission of the sub-pixels 7. If the metal strip 4 extends in the first direction y, the extending direction of the metal strip 4 and the arrangement direction of the sub-pixels 7 will be the same. FIG. 14 is a schematic view of the metal strip 4 extending in the first direction y. As shown in FIG. 14, the whole metal strip 4 shields the corresponding sub-pixels, and thus, compared with the arrangement manner shown in FIG. 13, light emitted by a larger area of sub-pixels is shielded, affecting the display effect.

It can be understood that when the display panel works, the first electrode 1 may serve as a touch driving electrode to send a touch signal; and the second electrode 2 may serve as a touch sensing electrode to sense the signal sent from the first electrode 1.

Alternatively, the second electrode 2 serves as the touch driving electrode to send the touch signal; and the first electrode 1 serves as the touch sensing electrode to sense the signal sent from the second electrode 2.

Figure 15:
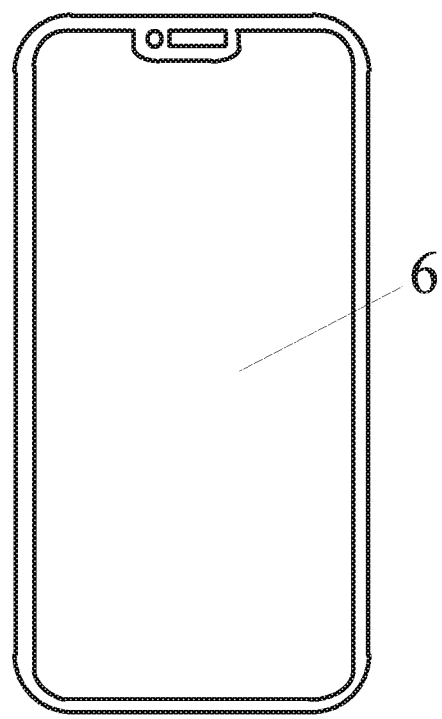
FIG. 15 is a schematically structural view of a display device according to an embodiment of the present disclosure.

Some embodiments of the present disclosure further provide a display device. Referring to FIG. 15, FIG. 15 is a schematically structural view of a display device according to an embodiment of the present disclosure. The display device 6 includes the above-described display panel. The specific structure of the display panel is described in detail in the above embodiments, and will not be described herein. The display device 6 shown in FIG. 15 is only used for illustrative description. The display device 6 may be any electronic equipment having a display function, such as a mobile phone, a tablet computer, a notebook computer, an e-book or a television.

As the display device includes the above display panel, in the display device provided by the present disclosure, the bridge structure connecting two adjacent second electrode blocks includes at least two bridges. In addition, the length of the first overlapping electrode in the first direction y is smaller than a length of the first non-overlapping electrode in the first direction y. Based on this structure, in the present disclosure, when one bridge breaks, the remaining bridge(s) still can connect the two adjacent second electrode blocks, so that a failure risk of the second electrode due to the breakage of the bridge is reduced, thereby increasing the reliability of a touch electrode. Moreover, in the present disclosure, the length of the first non-overlapping electrode in the first direction is set to be larger than the length of the first overlapping electrode in the first direction. That is, in the first direction, the first non-overlapping electrode is widened relative to the first overlapping electrode, which means the amount of electric charge flowing through the first non-overlapping electrode is increased when the display panel works, namely, the resistance of the first non-overlapping electrode being reduced. Thus, the resistance of the first connection electrode is reduced, so that the problem of increased resistance caused by the thin first overlapping electrode at the position corresponding to the bridge in the first electrode is solved, thereby improving the touch sensitivity of the display panel. In addition, in the present disclosure, as the first non-overlapping electrode is widened, the large resistance problem caused by a thin first overlapping electrode is solved. Further, in the present disclosure, the first overlapping electrode may be set as short as possible in the first direction, and accordingly, the bridge is set as short as possible in the first direction, so as to reduce the visibility of the bridge and improve a display effect. Besides, an overlapping area of the first electrode 1 and the second electrode 2 may also be reduced when the bridge is set as short as possible in the first direction, so that in an touch operation, interference between a touch driving signal and a touch sensing signal is reduced, improving the touch sensitivity.

The foregoing descriptions are embodiments of the present disclosure, and are not intended to limit the present disclosure. Any variation, equivalent substitution and modification that fall within the principle of the present disclosure should fall into the protection scope of the present disclosure.

What is claimed is:

1. A display panel, comprising:
a plurality of first electrodes which is arranged in a first direction and extends in a second direction, and
a plurality of second electrodes which is arranged in the second direction and extends in the first direction; wherein
each of the plurality of first electrodes comprises a plurality of first electrode blocks and a plurality of first connection electrodes, the plurality of first electrode blocks and the plurality of first connection electrodes being arranged alternately in the second direction; and any two adjacent first electrode blocks in the each first electrode are electrically connected to each other by at least one of the plurality of first connection electrodes;
each of the plurality of second electrodes comprises a plurality of second electrode blocks and a plurality of bridge structures, the plurality of second electrode blocks and the plurality of bridge structures being arranged alternately in the first direction; and any two adjacent second electrode blocks in the each second electrode are electrically connected to each other by at least one of the plurality of bridge structures, and each of the plurality of bridge structures comprises at least two separate bridges each connected to the two adjacent second electrode blocks connected to the bridge structure;
each of the plurality of first connection electrodes comprises a first overlapping electrode and a first non-overlapping electrode, wherein an orthographic projection of the first overlapping electrode on the display panel overlaps an orthographic projection of at least one bridge of the plurality of bridge structures on the display panel, and an orthographic projection of the first non-overlapping electrode on the display panel does not overlap an orthographic projection of any bridge of the plurality of bridge structures on the display panel;

wherein the plurality of first electrode blocks, the first overlapping electrode, the first non-overlapping electrode and the plurality of second electrode blocks are arranged in a same layer that is different from a layer where the plurality of bridge structures is located; and the first overlapping electrode has a length in the first direction smaller than a length of the first non-overlapping electrode in the first direction.

2. The display panel of claim 1, wherein the length of the first overlapping electrode in the first direction is d1;

the first non-overlapping electrode comprises a plurality of first non-overlapping sub-electrodes arranged in the second direction; and lengths of the plurality of first non-overlapping sub-electrodes in the first direction increase first and then decrease; and among the plurality of first non-overlapping sub-electrodes, a length of a longest non-overlapping sub-electrode in the first direction is dmax, and dmax is greater than or equal to 1.5 d1; and a length of a shortest non-overlapping sub-electrode in the first direction is dmin, and dmin is equal to d1.

3. The display panel of claim 2, wherein a length of the first non-overlapping electrode in the first direction is d2, and d2 is greater than or equal to 100 µm.

4. The display panel of claim 1, wherein a distance between any two adjacent bridges in each of the plurality of bridge structures in the second direction is d and d is greater than 0 µm and less than 150 µm.

5. The display panel of claim 1, further comprising a plurality of sub-pixels arranged in an array in the first direction and the second direction; and an extension direction of the bridges is different from the first direction.

6. The display panel of claim 1, wherein an insulating layer is arranged between the first overlapping electrode and a bridge whose orthographic projection on the display panel overlaps an orthographic projection of the first overlapping electrode on the display panel; and each bridge of the plurality of bridge structures is connected to two adjacent second electrode blocks through a via hole provided in the insulating layer.

7. The display panel of claim 1, further comprising a metal strip in contact with a layer where the first overlapping electrode is located; and an orthographic projection of the metal strip on the display panel is located within an orthographic projection of the first non-overlapping electrode on the display panel.

8. The display panel of claim 7, wherein the metal strip and the at least two bridges of each of the plurality of bridge structures are located in the same layer.

9. The display panel of claim 7, further comprising a plurality of sub-pixels arranged in an array in the first direction and the second direction; and an extension direction of the metal strip is different from both the first and second directions.

10. The display panel of claim 7, wherein the number of the metal strip located in a orthographic projection of the first non-overlapping electrode of each first connection electrode on the display panel is n and n is greater than or equal to 1 and less than or equal to 3.

11. The display panel of claim 7, wherein a material of the metal strip comprises any one of molybdenum, silver or aluminum.

12. The display panel of claim 1, wherein a material of the plurality of first electrodes and a material of the plurality of second electrodes comprise any one of indium tin oxide, indium zinc oxide, or indium gallium zinc oxide; and a material of the at least two bridges of each of the plurality of bridge structures comprises any one of molybdenum, silver or aluminum.

13. The display panel of claim 1, wherein each of the plurality of first electrodes is a touch driving electrode and each of the plurality of second electrodes is a touch sensing electrode; or each of the plurality of first electrodes is a touch sensing electrode and each of the plurality of second electrodes is a touch driving electrode.

14. A display device, comprising:
a display panel, wherein display panel comprises:
a plurality of first electrodes which is arranged in a first direction and extends in a second direction, and
a plurality of second electrodes which is arranged in the second direction and extends in the first direction; wherein
each of the plurality of first electrodes comprises a plurality of first electrode blocks and a plurality of first connection electrodes, the plurality of first electrode blocks and the plurality of first connection electrodes being arranged alternately in the second direction; and any two adjacent first electrode blocks in the each first electrode are electrically connected to each other by at least one of the plurality of first connection electrodes;
each of the plurality of second electrodes comprises a plurality of second electrode blocks and a plurality of bridge structures, the plurality of second electrode blocks and the plurality of bridge structures being arranged alternately in the first direction; and any two adjacent second electrode blocks in the each second electrode are electrically connected to each other by at least one of the plurality of bridge structures, and each of the plurality of bridge structures comprises at least two separate bridges each connected to the two adjacent second electrode blocks connected to the bridge structure;
each of the plurality of first connection electrodes comprises a first overlapping electrode and a first non-overlapping electrode, wherein an orthographic projection of the first overlapping electrode on the display panel overlaps an orthographic projection of at least one bridge of the plurality of bridge structures on the display panel, and an orthographic projection of the first non-overlapping electrode on the display panel does not overlap an orthographic projection of any bridge of the plurality of bridge structures on the display panel;
wherein the plurality of first electrode blocks, the first overlapping electrode, the first non-overlapping electrode and the plurality of second electrode blocks are arranged in a same layer that is different from a layer where the plurality of bridge structures is located; and
the first overlapping electrode has a length in the first direction smaller than a length of the first non-overlapping electrode in the first direction.

15. The display device according to claim 14, wherein the length of the first overlapping electrode in the first direction is d1;

the first non-overlapping electrode comprises a plurality of first non-overlapping sub-electrodes arranged in the second direction; and lengths of the plurality of first non-overlapping sub-electrodes in the first direction increase first and then decrease; and among the plurality of first non-overlapping sub-electrodes, a length of a longest non-overlapping sub-electrode in the first direction is dmax, and dmax is greater than or equal to 1.5 d1; and a length of a shortest non-overlapping sub-electrode in the first direction is dmin, and dmin is equal to d1.

16. The display device according to claim 14, wherein a distance between any two adjacent bridges in each of the plurality of bridge structures in the second direction is d and d is greater than 0 μm and less than 150 μm.

17. The display device according to claim 14, wherein the display panel further comprises a plurality of sub-pixels arranged in an array in the first direction and the second direction; and an extension direction of the bridges is different from the first direction.

18. The display device according to claim 14, wherein the display panel further comprises a metal strip in contact with a layer where the first overlapping electrode is located; and an orthographic projection of the metal strip on the display panel is located within an orthographic projection of the first non-overlapping electrode on the display panel.

19. The display device according to claim 18, wherein the display panel comprises a plurality of sub-pixels arranged in an array in the first direction and the second direction; and an extension direction of the metal strip is different from both the first and second directions.

20. The display device according to claim 14, wherein a material of the plurality of first electrodes and a material of the plurality of second electrodes comprise any one of indium tin oxide, indium zinc oxide, or indium gallium zinc oxide; and a material of the at least two bridges of each of the plurality of bridge structures comprises any one of molybdenum, silver or aluminum.

* * * * *